United States Patent [19]
Olugboji

[11] Patent Number: 5,321,451
[45] Date of Patent: Jun. 14, 1994

[54] TRANSPARENCY FOLDER AND HOLDER APPARATUS

[76] Inventor: Bunmi Olugboji, 4424 E. Baseline Rd., #2154, Phoenix, Ariz. 85044

[21] Appl. No.: 109,908

[22] Filed: Aug. 23, 1993

[51] Int. Cl.$^5$ ............................................. G03B 21/00
[52] U.S. Cl. ................. 353/120; 353/DIG. 5
[58] Field of Search .......... 353/120, DIG. 3, DIG. 1, 353/DIG. 5, 118

[56] References Cited

U.S. PATENT DOCUMENTS

| | | | |
|---|---|---|---|
| 3,110,217 | 11/1963 | Millner et al. | 353/DIG. 5 |
| 3,561,862 | 2/1971 | Albee, Jr. | 353/DIG. 5 |
| 3,709,590 | 1/1973 | Bisberg | 353/120 |
| 3,913,740 | 10/1975 | Bisberg | 353/120 |
| 4,137,650 | 2/1979 | Hayes | 40/533 |
| 4,679,923 | 7/1987 | Nielser | 353/120 |

Primary Examiner—William A. Cuchlinski, Jr.
Assistant Examiner—William C. Dowling
Attorney, Agent, or Firm—H. Gordon Shields

[57] ABSTRACT

Folder apparatus for holding and positioning a plurality of transparencies for projection by an overhead projector includes a base panel element with two wing panels extending outwardly and in opposite directions from and secured to the base element. The transparencies are disposed against one wing panel and are movable from the position against the one panel to a position on the base panel for projection, and are movable from the projection position on the base panel to a storage position against the second panel. Transparencies include hook elements which move in slots or tracks secured to the base panel.

11 Claims, 2 Drawing Sheets

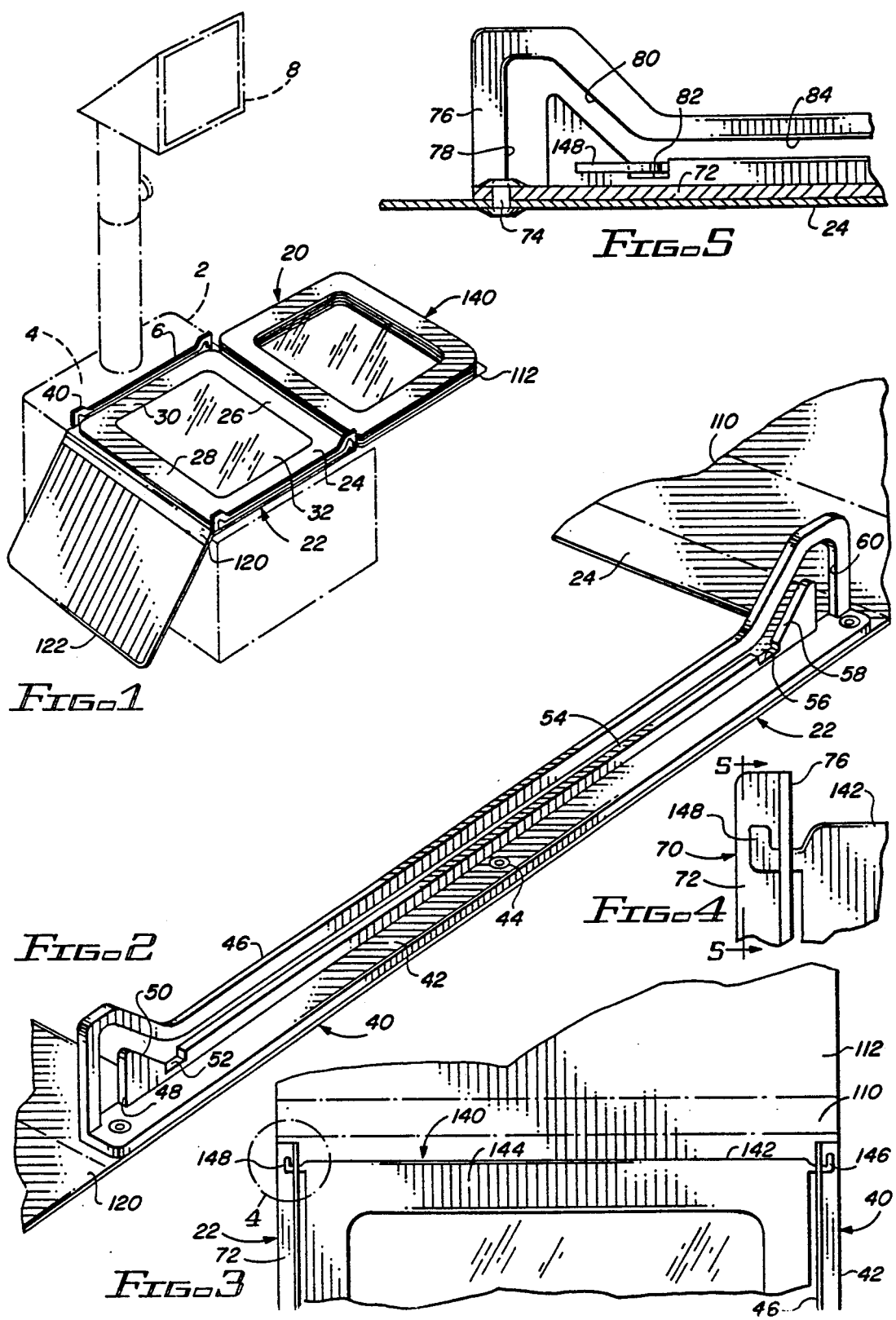

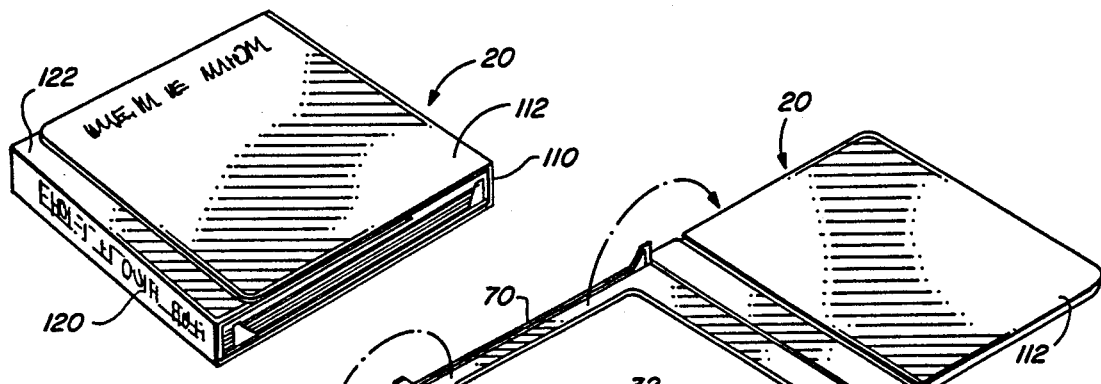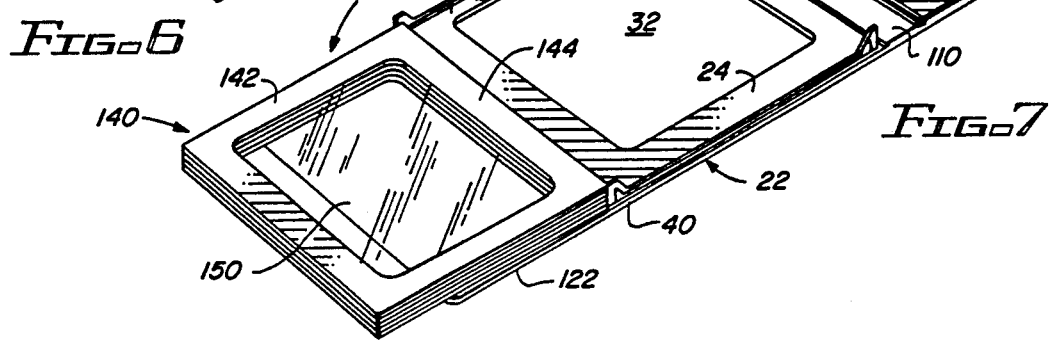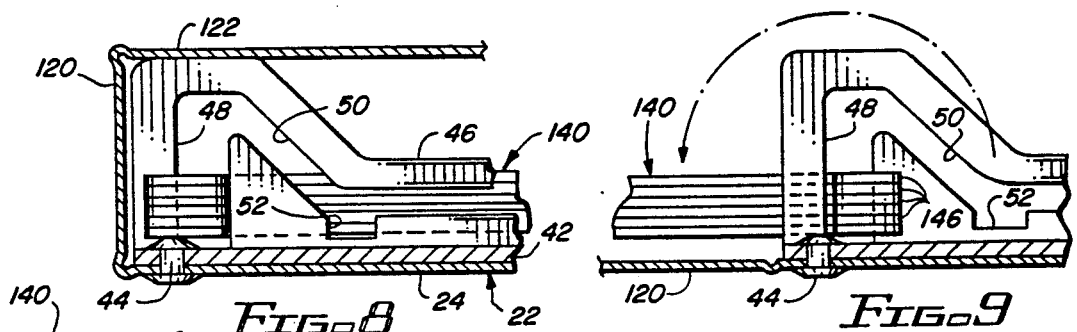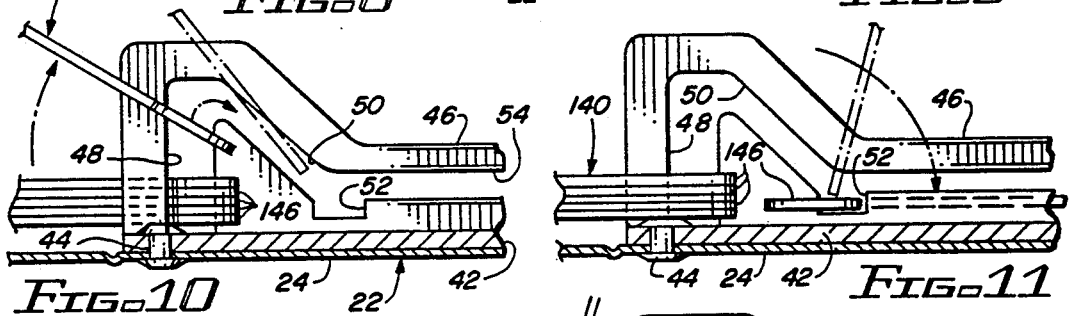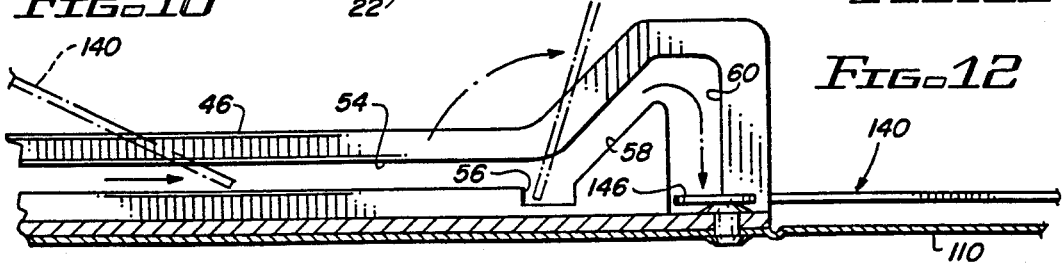

TRANSPARENCY FOLDER AND HOLDER APPARATUS

BACKGROUND OF THE INVENTION

1. Field of the Invention

This invention relates to holder apparatus for transparencies and, more particularly, to a folder for holding a plurality of transparencies for sequential projection.

2. Description of the Prior Art

U.S. Pat. No. 3,709,590 (Bisberg) discloses a three-leaf folder for holding transparencies to be projected by an overhead projector. The leaves are hinged to a base element. The base element is disposed on the top surface of an overhead projector. The apparatus includes a support frame against which the transparencies may be disposed. Multiple transparencies may be projected, but the transparencies are overlays, and may accordingly may not be projected selectively individually.

U.S. Pat. No. 3,913,740 (Bisberg) discloses another folder for use with an overhead projector. The apparatus includes structure similar to that of the '590 Patent. The apparatus of the '740 Patent may be used with the apparatus of the '590 Patent. Both patents are by the same patentee. The apparatus includes four separate elements, connected together, with a base element and three elements secured to the sides of the base element. A plurality of transparencies is secured between two of the hinged elements.

U.S. Pat. No. 4,137,650 (Hayes) discloses a teaching aid for transparencies usable with an overhead projector. The apparatus includes a base element to which a number of transparencies are secured for sequential or individual projection. The base element includes four flaps foldable over the base element to define a container. The elements are hinged together to comprise a unitary structure.

SUMMARY OF THE INVENTION

The invention describes and claimed herein comprises a folder for holding a plurality of transparencies which may be individually or sequentially projected by an overhead projector. The apparatus includes a base element with outwardly extending panels secured to and extending oppositely outwardly from the base element. The two panels are hingedly secured to the base panel and the two outer panels are connected together by a pair of metal strips with tracks extending through or along the strips. Transparencies to be projected are secured to pins, and the outer ends of the pins are disposed in the tracks or grooves in the metal strips. The transparencies may then be pivotly disposed from one panel onto the base panel for projection, and then may be moved in the track or groove to the opposite panel.

Among the objects of the present invention are the following:

To provide new and useful folder apparatus for holding a plurality of transparencies to be projected by an overhead projector;

To provide new and useful apparatus for holding a plurality of transparencies for sequential and individual projection;

To provide new and useful folder apparatus for holding a plurality of transparencies, with the transparencies movable from a first storage or pre-projection position to a projection position, and from the projection position to a second storage position;

To provide new and useful folder apparatus for sequentially dispensing transparencies for presentation;

To provide new and useful folder apparatus for sequentially projecting transparencies in order and for easily and quickly reversing the order as desired;

To provide new and useful folder apparatus having a base element and two panels secured to the base element, and the panels are pivotly or hingedly secured to the base element; and To provide new and useful folder apparatus for holding a plurality of transparencies, and the transparencies are secured to pins and the pins are in turn secured to the folder for movement relative thereto.

BRIEF DESCRIPTION OF THE DRAWING

FIG. 1 is a perspective view of the apparatus of the present invention in its use environment.

FIG. 2 is a perspective view of a portion of the apparatus of the present invention.

FIG. 3 is a plan view of a portion of the apparatus of the present invention.

FIG. 4 is an enlarged view taken generally from circle 4 of FIG. 3.

FIG. 5 is a view in partial section taken generally along line 5—5 of FIG. 4.

FIG. 6 is a perspective view of the apparatus in its storage mode.

FIG. 7 is a perspective view of the apparatus of the present invention open in its use mode.

FIG. 8 is an end view of a portion of the apparatus of the present invention.

FIG. 9 is an enlarged end view sequentially following FIG. 8 and illustrating the use of the apparatus of the present invention.

FIG. 10 is an enlarged end view illustrating the operation of the apparatus sequentially following FIG. 9.

FIG. 11 is an enlarged end view illustrating the operation of the apparatus of the present invention sequentially following FIG. 10.

FIG. 12 is an enlarged end view of another portion of the apparatus of the present invention sequentially following FIG. 11 and illustrating the operation of the apparatus.

DESCRIPTION OF THE PREFERRED EMBODIMENT

FIG. 1 is a perspective view of an overhead or opaque projector 2 with transparency holder and folder apparatus 20 of the present invention disposed on the projector 2. The projector 2 includes a top surface 4, and a portion of the top surface 4 includes a light source platform 6 on which the apparatus 20 is disposed. Above the light source platform and the top 4 is a projection lens 8. As is well known and understood, transparencies are disposed on the light source platform 6 and, when the light within the projector 2 is turned on, the light is projected upwardly towards the projection lens 8 and is then projected outwardly onto a screen. A user of the apparatus stands by the projector apparatus 2 for discussing the material displayed on the transparencies and projected onto the screen.

The apparatus 20 includes three pivotly connected portions, a center portion or base 22 and two wing portions 112 and 122.

The apparatus 20 of the present invention is shown in its open position or orientation on the top 4 in FIG. 1, and the apparatus 20— is shown in detail in FIGS. 2-12.

FIG. 2 is a perspective view of a portion of the apparatus 20, FIG. 3 is a top or plan view of another portion of the apparatus 20. FIG. 4 is an enlarged top or plan view of a portion of the apparatus 20 taken generally from circle 4 of FIG. 3, illustrating a particular texture. FIG. 5 is an enlarged view in partial section of a portion of the apparatus 20 taken generally along line 5—5 of FIG. 4.

FIGS. 6 and 7 are perspective views of the apparatus 20 illustrating the apparatus 20 in its folded, storage condition and in its open, use condition, respectively. Dash dot arrows in FIG. 7 illustrate the pivoting of the wing portions 112 and 122 relative to the base portion 22.

FIGS. 8-12 are side views in partial section sequentially illustrating the operation and use of the apparatus 20.

For the following discussion, reference will be made to all the Figures in general, specific reference will be made to particular drawing Figures as appropriate.

The transparency folder and holder apparatus 20 includes the three primary portions, a central portion 22 which comprises a base frame and elements secured thereto, and two outer or wing portions, including the wing portion or cover 112 and the wing portion or cover 122. The wing portions or covers are appropriately hinged to the base frame 22.

The base frame 22, which is the central frame, as mentioned above, includes four perimeter frame members, all of which are shown in FIG. 1. There is a bottom perimeter frame member 24, a pair of side perimeter frame members 26 and 28, and a top or upper perimeter frame member 30. Within the perimeter frame members is a central area 32. The central area 32 is preferably covered by a transparent supporting element or material window.

Secured to the bottom perimeter frame member 24 is a bottom track strip or guide frame 40. Secured to the upper perimeter frame member 30 is a top track strip or guide frame 70. The two track strips or guide frame members 40 and 70 are substantially identical to each other.

The bottom track strip or guide frame member 40 includes a base 42 which is appropriately secured to the frame member 24 by a plurality of fastener elements 44. The fastener elements 44 may be rivets, or any appropriate element which secures the base 42 to the frame member 24.

Extending upwardly from the base 42 is a vertical arm 46. The vertical arm 46 includes several connected slots or slot portions extending the length of the guide frame 40. As best shown in FIG. 2, there is a vertical end slot 48 which extends upwardly from the base 42. Continuing on from the top or upper portion of the vertical end slot 48 there is a sloping end slot 50. At the bottom of the sloping end slot 50 there is a downwardly extending reversing slot 52. From the reversing slot 52, there is a longitudinally extending slot 54.

At the opposite end of the guide frame 40 from the reversing slot 52 and the sloping end slot 50 and the vertical end slot 48, there are three slot elements which are substantially identical to the latter slots. They include a reversing slot 56, a sloping slot 58, and a vertical slot 60. In other words, at the opposite ends of the longitudinal slot 54 are three slots which are essentially mirror images of each other.

The top guide frame 70, portions of which are best shown in FIGS. 3, 4, and 5, is substantially identical to, but is a mirror image of, the bottom guide frame 40, as indicated above. The two guide frames or track strips 40 and 70 are disposed generally parallel to each other. The guide frame 70 includes a base 72 which is appropriately secured to the frame member 30 by a plurality of fasteners 74, as shown in FIG. 5.

Extending upwardly from the base 72 is a vertical arm 76. The vertical arm 76 includes a vertical end slot 78, a sloping slot 80 extending from the vertical end slot 78, and a reversing slot 82 at the bottom of the sloping slot 80. A longitudinal slot 84 extends generally horizontally to the opposite end of the guide frame 70 from the slots 78, 80, and 82.

At the opposite end of the longitudinal slot 84 from the slots 78, 80, and 82, there is a reversing slot, a sloping slot, and a vertical slot. The latter slots, not shown, comprise substantially a mirror image of the slots 82, 80, and 78, respectively. The various slots of the track strip or guide frame 70 are appropriately aligned with the corresponding slots 48...60 of the track strip or guide frame 40.

The two covers 112 and 122 are appropriately secured to the base frame 22 by hinges 110 and 120, respectively. The length of the hinge portions or elements 110 and 120 corresponds to the height of the vertical arms 46 and 76 of the guide frames 40 and 70. This is best shown in FIGS. 6 and 8. The hinge elements 110 are, of course, appropriately hingedly or pivotly secured to the base frame 22 and to the respective covers 112 and 122.

FIG. 6 shows the apparatus 20 in its closed configuration, with the wing covers 112 and 122 folded to appropriately cover the base frame 22 and a plurality of mounted transparencies 140 secured to the base frame 22.

In FIGS. 1 and 7, the wing covers 112 and 122 are shown in their open position, with the plurality of mounted transparencies 140 secured to the guide frames.

The operation of the transparencies 140 is illustrated primarily in FIGS. 8, 9, 10, 11, and 12, sequentially. However, reference will also be made to other Figures, such as FIGS. 3, 4, 5, and 7, as appropriate, in the following discussion.

Each mounted transparency 140, perhaps best shown in FIG. 7, includes a perimeter frame 142 to which is secured a transparency 150. The frame 142 may be made of paper, plastic, or any appropriate material, as desired. The transparency 150, of course, includes any information or data which is desired to be projected by the projector 2 onto a screen (not shown) for a presentation.

Each perimeter frame 142 includes what may be simply referred to as an inside or side member 144. The inside member 144 includes two end slide hooks 146 and 148, as best shown in FIG. 3. The slide hooks 146 and 148 are disposed in the slots of the guide frames 40 and 70, respectively. The end slide hooks 146 may be integral with the frame 142, if desired, or they may be the outer ends of a separate element extending through a sleeve on the end of the inside or end member 144 of the perimeter frame 142.

The end slide hooks 146 and 148 are disposed in the slots in the vertical arms 46 and 76 of the guide frames 40 and 70, respectively. The slide hooks allow the transparencies 140 to be guided as appropriate for the storage, projection, and storage again of the transparencies, as will be discussed below.

Sequentially, the apparatus 20, with a plurality of mounted transparencies 140, is configured as a book, as best shown in FIG. 6. Then, the apparatus 20 may be disposed on a projector 2, and opened as shown in FIG. 7, with the wings 112 and 122 in their open position, and the transparencies 140 are appropriately stacked, as shown in FIG. 7. This is also shown in FIG. 8. To begin operation of the projector 2 and the apparatus 20, the transparencies are shifted relative to the slot 148 as shown in FIG. 9, with the transparencies in their open position, as shown in FIGS. 9 and 7.

To show or project the first transparency 140, the top transparency 140 is moved upwardly in a vertical slot 48, as indicated in FIG. 10. Sequentially as illustrated in FIG. 10, the top or uppermost transparency 140 is moved upwardly, with its end slide hooks 146 and 148 moving vertically in the vertical end slots 48 and 78, respectively. The slide hooks 146 and 148 then move downwardly in the sloping slots 50 and 80, respectively, to the reversing slots 52 and 82. The purpose of the reversing slots is to allow the end hooks to move downwardly so that the transparencies 140 may be pivoted, as shown in FIG. 11. The transparency 140 is then pivoted through an arc until it lays down, disposed on the perimeter frame members 24 . . . 30 of the base frame 22 and over the central area 32 for appropriate projection.

After the projection of the top element is concluded, the transparency 140 then continues its move in the horizontal or longitudinal slots 54 and 84 to the opposite end of the guide frames where the slide hooks will move upwardly in the sloping slot 58 and its corresponding slot portion in the guide 70, and downwardly in the vertical slot 60 and its corresponding slot to the position on the hinge 110 and the wing 112 as shown in FIGS. 7 and 12.

With the top transparency 140 now in the temporary storage position, the next transparency 140 may then be projected by the same movements discussed in the preceding paragraphs. When the presentation is completed, with all of the transparencies 140 being disposed on the wing 112, as shown in FIG. 1, the apparatus 20 is ready to be refolded for storage. The refolding may, of course, be accomplished directly by moving the transparencies 140 back to the original position, as shown in FIG. 7, or they may simply be pivoted in the slots 60 and 80 for a reverse storage from that which they originally started. It will be noted that the vertical end slot is wider than the sloping slots 48, 58 and the horizontal slots to allow for the pivoting of the slide hooks 146, 148 through substantially a 180 degree arc for appropriate storage, etc.

It will also be noted and understood that the transparencies may be stacked in any order and may be projected from any side, as desired. The left to right explanation discussed above is merely one alternative. The other orientation, right to left, which would be reversing from FIG. 12 back to FIG. 8, may also be employed.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Folder apparatus for holding transparencies to be projected comprising in combination:
    base means for receiving a transparency to be projected;
    guide frame means secured to the base means for guiding the transparency to be projected, including
        a first vertical arm, and
        a first slot in the vertical arm; transparency means movable on the base means, including
        a transparency to be disposed on the base means and to be projected, and
        a first end hook secured to the transparency and disposed in the first slot in the vertical arm for guiding the transparency as it is moved on the base means.

2. The apparatus of claim 1 in which the guide frame means further includes a second vertical arm and a second slot in the second vertical arm, and the second vertical arm is disposed generally parallel to and spaced apart from the first vertical arm.

3. The apparatus of claim 2 in which the base means includes
    a central portion for receiving the transparency to be projected, and
    a perimeter frame disposed about the central portion; and
    the first and second vertical arms are secured to the perimeter frame on opposite sides of the central portion.

4. The apparatus of claim 3 in which the guide frame means further includes a first base secured to the perimeter frame and a second base secured to the perimeter frame, and the first and second vertical arms are secured respectively to the first and second bases.

5. The apparatus of claim 4 in which the transparency means further includes a perimeter frame to which the transparency is secured, and the first end hook is secured to the perimeter frame.

6. The apparatus of claim 5 in which the transparency means further includes a second end hook secured to the perimeter frame and disposed in the second slot of the second vertical arm.

7. The apparatus of claim 2 in which the first and second slots further include reversing slots for receiving the first end hook to allow the end hook and the transparency means to be reversed for moving and pivoting the transparency means.

8. The apparatus of claim 1 in which the base means includes
    a central portion for receiving the transparency,
    a base frame disposed about the central portion, including
        a first frame member,
        a second frame member generally parallel to and spaced apart from the first frame member,
        a third frame member secured to and extending between the first and second frame members, and
        a fourth frame member generally parallel to and spaced apart from the third frame member and also secured to the first and second frame members.

9. The apparatus of claim 8 in which the guide frame means further includes a second vertical arm secured to the fourth frame member, and the first vertical arm is secured to the third frame member.

10. The apparatus of claim 9 in which the base means further includes a first wing pivotally secured to the first frame member and a second wing pivotally secured to the second frame member.

11. The apparatus of claim 10 in which the transparency means further includes a plurality of transparencies disposed on the first wing and sequentially movable in the guide frame means onto the central portion of the base means for projecting and on to the second wing after being projected.

* * * * *